(12) United States Patent
Bartos (10) Patent No.: US 11,951,050 B2
(45) Date of Patent: Apr. 9, 2024

(54) LIFTING MECHANISM FOR A FOLDABLE RAMP FOR WHEELCHAIR ACCESS TO A PASSENGER CAR REAR DOOR AND FOLDABLE RAMP

(71) Applicant: API CZ s.r.o., Slapy u Tábora (CZ)

(72) Inventor: Miroslav Bartos, Tábor (CZ)

(73) Assignee: API CZ S.R.O., Slapy U Tábora (CZ)

( * ) Notice: Subject to any disclaimer, the term of this patent is extended or adjusted under 35 U.S.C. 154(b) by 2 days.

(21) Appl. No.: 17/592,716

(22) Filed: Feb. 4, 2022

(65) Prior Publication Data

US 2022/0241121 A1 Aug. 4, 2022

(30) Foreign Application Priority Data

Feb. 4, 2021 (EP) ..................................... 21155164

(51) Int. Cl.
*A61G 3/06* (2006.01)
(52) U.S. Cl.
CPC ............. *A61G 3/061* (2013.01); *A61G 3/066* (2013.01); *A61G 3/067* (2016.11)
(58) Field of Classification Search
CPC .. B60P 1/43; B60P 1/438; B60P 1/433; A61G 3/067; A61G 3/066; A61G 3/061
See application file for complete search history.

(56) References Cited

U.S. PATENT DOCUMENTS

| 3,335,442 | A | 8/1967 | Kumpolt | |
|---|---|---|---|---|
| 7,913,343 | B1* | 3/2011 | Cohn | B60P 1/433 14/71.3 |
| 8,869,333 | B2 | 10/2014 | Johnson et al. | |
| 9,820,899 | B1* | 11/2017 | Morris | B60P 1/43 |
| 2003/0210976 | A1* | 11/2003 | Koretsky | B60P 1/433 14/71.1 |
| 2003/0215316 | A1* | 11/2003 | Burney | B60P 1/431 414/537 |
| 2007/0059140 | A1* | 3/2007 | Kiser | B60P 1/433 414/545 |

FOREIGN PATENT DOCUMENTS

| DE | 202016103784 U1 | 3/2017 |
|---|---|---|
| WO | 2013158051 A1 | 10/2013 |

OTHER PUBLICATIONS

Extended European Search Report dated Jul. 14, 2021, Application No. 21155164.

* cited by examiner

*Primary Examiner* — Glenn F Myers
(74) *Attorney, Agent, or Firm* — Banner & Witcoff Ltd.

(57) ABSTRACT

A lifting mechanism for a foldable ramp may include a swivel lifting arm being biased in a passive position of the foldable ramp and being activatable for releasing and transmitting its bias into a lifting force on the foldable ramp. The foldable ramp may be for providing wheelchair access to a passenger car rear door. The foldable ramp can be swivelled between several positions including a passive position in which the foldable ramp is arranged in the car in a lying position.

18 Claims, 6 Drawing Sheets

LIFTING MECHANISM FOR A FOLDABLE RAMP FOR WHEELCHAIR ACCESS TO A PASSENGER CAR REAR DOOR AND FOLDABLE RAMP

CROSS REFERENCE TO RELATED APPLICATIONS

This patent application claims priority to European Patent Application No. 21155164.3, filed Feb. 4, 2021, which is incorporated herein by reference in its entirety.

BACKGROUND

Field

The present disclosure relates to a lifting mechanism for a foldable ramp for wheelchair access to a passenger car rear door and to such a foldable ramp for wheelchair access to a passenger car rear door.

Related Art

In order to make motor vehicles, especially compact cars or off-road vehicles, suitable for wheelchair users, the OEM-side-mounted vehicles are in general upgraded with a replacement floor designed to make available considerably more space, especially in the vertical direction, so that a wheelchair user can sit upright on the wheelchair in the vehicle interior cargo and is safely accommodated and with a vehicle ramp attached to the vehicle to enable the wheelchair user to easily enter and leave the vehicle. The ramps may also be used for electric scooters and similar equipment provided with wheels.

At present, an important portion of vehicles are those operated in the so-called combined operation. This means that vehicles are used alternately for transport of healthy persons or regular loads and also for transport of disabled persons, persons with health-related limitations or physical disability who need to use wheelchairs. In practical terms, they include vehicles used by e.g. taxi services, hotels, travel agencies, as well as family cars used intermittently for regular daily transport for private and business purposes, as well as for transport of a person in a wheelchair.

It is therefore desirable that the foldable ramp takes up as little space inside the vehicle as possible and that normal operation of the vehicle is possible when the ramp is folded. It is also necessary that the control of folding of the ramp in and out is simple, safe and physically undemanding even for persons who are not physically strong or who may have certain limitations due to their health condition or age.

According to the European patent EP 3 400 924 B1 of the applicant, a foldable ramp for wheelchair access to a passenger car rear door is known which may be moved between at least three operational states, namely between an entry position in which the foldable ramp is folded out of the vehicle to allow wheelchair access to the car, a vertical transport position in which a wheelchair has accessed the interior of the passenger car via its rear door and in which the passenger car may be driven while the wheelchair and the entry platform are stored in the back of the passenger car, and a passive position in which the entry platform is provided in the passenger car in a horizontal lying position. The foldable ramp according to EP 3 400 924 B1 is provided with a biasing means generating a biasing force oriented against the gravitation force in order to counterbalance the weight of the entry platform and to ensure a smooth movement of the entry platform between its predefined positions. Also, the entry platform is prevented from falling down, in particular from the transport position into the entry position or the passive position, which could lead to a damage of the foldable ramp and/or to an injury of a user. The proven foldable ramp system of the applicant provides a massive improvement in terms of reducing the operational forces necessary for moving the foldable ramp between its operation positions over foldable ramp systems known so far. However, the operational forces especially for the initial uplifting of the foldable ramp from the horizontal passive position inside the vehicle cargo are still significantly high. Further, when the foldable ramp is stowed in the vehicle cargo for a person in order to uplift the ramp is necessary to lean inward in order to be able to lift the ramp and there is potential for improving the economic handling of the foldable ramp between its operation positions.

The inventors of the present disclosure have identified that the highest operational forces have to be applied during the initial uplifting of the ramp from the passive horizontal position, i.e. the first 10 cm uplift. The main reasons are the resistance of the latching mechanism that holds the ramp in its predefined operation positions and the above-mentioned economic aspect of restricted accessibility.

The applicant has found foldable ramp systems disclosed in the US publications U.S. Pat. Nos. 8,234,737, 8,122,553, and US 2004/0136820 A1, each being equipped with motor driven support mechanisms for reducing the necessary force of a user to uplift the ramp from the horizontal position into the entry position. The motors of the support mechanisms provide support forces when moving the ramp. However, none of the mentioned US publications has identified the "bottleneck" in terms of improving the handling of foldable ramps, namely the initial uplift out of the horizontal position. As a consequence, the support mechanisms of U.S. Pat. Nos. 8,234,737, 8,122,553, and US 2004/0136820 A1 are complex and equipped with expensive maintenance susceptible components.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art.

It is an object of the present disclosure to overcome the above-mentioned disadvantages of the state of the art, particularly to provide a lifting mechanism for a foldable ramp for wheelchair access to a passenger car rear door that is less complex and/or further decreases the necessary operational forces.

Embodiments of the disclosure relate to reducing the necessary operator forces for the initial uplift, for example the first 10 cm to 30 cm, of the foldable ramp out of the passive lying position. To address this issue, the disclosure proposes a lifting mechanism that is configured to provide a lifting force in order to automatically uplift the foldable ramp out of the lying passive position without the need of any operator forces.

According to an aspect of the present disclosure, a lifting mechanism for a foldable ramp providing wheelchair access to a passenger car rear door is provided. The foldable ramp may comprise a one-part or a multi-part entry platform which can be arranged in several positions. The foldable ramp can be swiveled between several positions including a passive position in which the foldable ramp is arranged in the car in a lying position. The foldable ramp, respectively the entry platform, may further be designed such that it may be arranged in an entry position in which the foldable ramp is folded out of the car to allow wheelchair access to the car. In the entry position, the foldable ramp may be oriented at an angle between 5° and 30°, preferably between 10° and 20°, relative to the horizontal. Due to such an orientation of the foldable ramp during access of the wheelchair, the wheelchair may easily and smoothly access the interior of the passenger car. For example, the length of the ramp in a length-wise direction of the car is larger than 20 cm and preferably less than 2.5 m, preferably between 50 cm and 2 m. The foldable ramp may be further configured such that it may be arranged in a transport position, i.e. a position in which a wheelchair has accessed the interior of the passenger car via its rear door and in which the passenger car may be driven while the wheelchair and the entry platform are stored in the back of the passenger car. In the transport position, the entry platform may be oriented in an upright position, particularly in a vertical position.

The lifting mechanism comprises a swivel lifting arm being biased in the passive position of the foldable ramp and being activatable, respectively the lifting mechanism is activatable, for releasing and transmitting its bias into a lifting force on the foldable ramp. In other words, when being activated the swivel lifting arm performs a swivel motion and transmits its moment of force into a lifting force for lifting the foldable ramp out of the passive position. Except the activation of the lifting mechanism respectively of the swivel lifting arm, no operator input and/or force is necessary for lifting the foldable ramp. The swivel lifting arm may be part of a particularly mechanic transmission for transmitting the biasing force into the lifting force. When transmitting its bias into a lifting force on the foldable ramp, the swivel lifting arm may perform a swivel motion and transmit its moment of force into a moment of force assigned to the foldable ramp. The swivel radius of the swivel lifting arm may be smaller, in particular smaller than a half, a third or even a quarter of the swivel radius of the foldable ramp.

The activation of the lifting mechanism respectively the swivel lifting arm may be done manually, for example by releasing a mechanical interlock, or electrically, in particular by means of an electrical switch, for example a magnetic switch. The mechanical interlock may be connected to a pull rod accessible for the operator. Upon pulling the pull rod, the mechanical interlock may be released in order to activate the lifting mechanism respectively the swivel lifting arm.

The lifting mechanism may also comprise an interlock for securing the lifting mechanism respectively the swivel lifting arm against motion in the passive position of the foldable ramp. In this state, the interlock may prevent the bias to be released. For example, the interlock mechanism may comprise a particularly hook shaped latch which is pre-tensioned, in particular via a spring, into a locking position in which the interlock mechanism prevents the swivel lifting arm against swiveling. The latch of the interlock mechanism may cooperate with a locking or securing carrier fixedly connected to the swivel lifting arm. Due to the biasing of the swivel lifting arm the swivel lifting arm tends to release its bias and to perform a swivel motion. The interlock mechanism is designed and arranged to counteract the biasing of the swivel lifting arm such that in the locking position of the interlock mechanism the swivel lifting arm is secured against motion. In the locking position the direction of force of the swivel lifting arm bias is arranged parallel with regard to the bias of the interlock mechanism. For example, the latch may be connected to a pull rod which may be operated, particularly pulled, by an operator to release the interlock mechanism, in particular to enable the interlock mechanism to release the interlock carrier such that the lifting mechanism may uplift the foldable ramp.

In an example embodiment of the lifting mechanism, the bias is generated by a force accumulator, such as a mechanic, electric, pneumatic, hydraulic and/or magnetic force accumulator. The force accumulator may be designed to bias or pre-tension the swivel lifting arm in the passive position of the foldable ramp. The force accumulator may accumulate forces respectively energy which, upon activation of the lifting mechanism, may be transmitted into a lifting force acting on the foldable ramp in order to swivel the ramp upwards from the lying, preferably horizontal, passive position. Due to the force accumulator, the manual operating force for uplifting the foldable ramp may be reduced, in particular prevented. The entire force necessary for uplifting the foldable ramp out of the passive position may be provided by the force accumulator. In a further embodiment of the lifting mechanism, the force accumulator is dimensioned, respectively designed in dependence of the foldable ramp, in particular in dependence of the dimensions and/or weight of the foldable ramp.

In another example embodiment of the lifting mechanism the force accumulator comprises a spring, such as an extension spring. The spring may be releasably attached to the lifting mechanism such that maintenance and replacement may be easily performed. According to a further development, the swivel lifting arm comprises a force application section for transmitting a lifting force on the foldable and a lever section opposite the force application section connected to the extension spring. For example, the swivel lifting arm may comprise an L-shape, wherein particularly one of the limbs of the L-shaped swivel lifting arm forms the force application section and the other limb forms the lever section. Particularly, the swivel axis of the swivel lifting arm crosses the swivel lifting arm and is arranged between the force application section and the lever section, in particular, in the area of the transition between the force application section and the lever section. The force application section may comprise a hook or latch-shaped ending configured to engage a force carrier of the ramp. It is clear that the moment arms of the force application section and the lever section may be configured such that the accumulated force by the force accumulator is increased via the swivel lifting arm, particularly because of the moment arm of the force application section being longer than the moment arm of the lever section.

In another example embodiment of the lifting mechanism, the swivel lifting arm is rotatably mounted with regard to the foldable ramp such that upon activation of the swivel lifting arm respectively the lifting mechanism the bias generates a moment of force that causes the swivel lifting arm to swivel relative to a swivel axis and to apply a lifting force on the foldable ramp. The lifting mechanism may be referred to as a transmission transmitting the moment of force of the swivel lifting arm into a moment of force of the foldable ramp.

According to another example embodiment, the lifting mechanism further comprises a linkage arm rotatably mounted to the swivel lifting arm and being biased, particularly by the force accumulator, in the passive position of the foldable ramp. The linkage arm may be rotatably mounted on a mounting pin fixedly attached to the swivel lifting arm. Upon activation of the swivel lifting arm respectively the lifting mechanism, the bias of the linkage arm is transmitted into a support for supporting the swivel lifting arm lifting force. In other words, the linkage arm as well as the swivel lifting arm are connected to the same force applicator, in particular extension spring. The linkage arm and the swivel lifting arm may be arranged and/or connected with the spring such that in the passive position of the foldable ramp the linkage arm and the swivel lifting arm pull the spring in opposite directions. Conclusively, upon activation of the lifting mechanism and upon releasing the bias of the force accumulator, preferably the spring, compression of the spring at the same time causes a swivel motion of the swivel linkage arm and of the linkage arm particularly in opposite directions of swivel.

According to a further development of the lifting mechanism, the swivel lifting arm and the linkage arm form a knee lever mechanism or transmission. It has been found out that due to the combined movement of the linkage arm and the swivel lifting arm according to a knee lever mechanism the resulting lifting force may be increased such that even big dimensioned foldable ramps may be easily and/or automatically lifted from the lying passive position without the necessity for the operator to manually pull or uplift the ramp.

In a further development of the lifting mechanism, the linkage arm is connected to the force accumulator such that upon activation of the swivel linking arm respectively the lifting mechanism the force accumulator releases, thereby causing the swivel lifting arm and linkage to oppositely swivel. Due to this arrangement of the linkage arm and the swivel lifting arm, a space saving effective lifting mechanism respectively force transmission is provided.

In another example embodiment of the lifting mechanism, the linkage arm and the swivel lifting arm are arranged essentially parallel with regard to each other in the passive position of the foldable ramp and are oriented at an angle particularly in the range of 45° to 135°, particularly in the range of 60° to 120° or in the range 75° to 105°, in a lifted position of the foldable ramp. In the lifted position of the foldable ramp which may, for example, be a predefined limited lifting amplitude, after having released the entire bias of the force accumulator, the linkage arm and the swivel lifting arm may be arranged in the form of a triangle with the extension spring connecting the linkage arm and the swivel lifting arm.

In a further example embodiment of the lifting mechanism, the linkage arm is guided in a linear motion bearing, particularly a shifting link or Stephenson valve gear or Stephenson link. The force accumulator may cooperate with the linear motion bearing in particular such that the force accumulator pulls the linkage arm along a linear motion bearing when being released. Due to the guidance of the combined translational rotational movement of the linkage arm reliable functioning of the lifting mechanism is ensured and damage to its components is prevented.

According to a further aspect of the present disclosure which may be combined with the previous aspects and exemplary embodiments, a lifting mechanism for a foldable ramp that provides wheelchair access to a passenger car rear door is provided.

The foldable ramp may comprise a one-part or a multi-part entry platform which can be arranged in several positions. The foldable ramp can be swiveled between several positions including a passive position in which the foldable ramp is arranged in the car in a lying position. The foldable ramp, respectively the entry platform, may further be designed such that it may be arranged in an entry position in which the foldable ramp is folded out of the car to allow wheelchair access to the car. In the entry position, the foldable ramp may be oriented at an angle between 50 and 30°, preferably between 10° and 20°, relative to the horizontal. Due to such an orientation of the foldable ramp during access of the wheelchair, the wheelchair may easily and smoothly access the interior of the passenger car. For example, the length of the ramp in a length-wise direction of the car is larger than 20 cm and preferably less than 2.5 m, preferably between 50 cm and 2 m. The foldable ramp may be further configured such that it may be arranged in a transport position, i.e. a position in which a wheelchair has accessed the interior of the passenger car via its rear door and in which the passenger car may be driven while the wheelchair and the entry platform are stored in the back of the passenger car. In the transport position, the entry platform may be oriented in an upright position, particularly in a vertical position.

According to this aspect of the lifting mechanism, the lifting mechanism is configured to exert a lifting force on the foldable ramp in a passive position for a predefined limited swiveling amplitude of the foldable ramp of at most 60°, 45° or 30°. This aspect addresses the issue of the "bottleneck" in terms of improving the ergonomic handling of foldable ramps and in terms of effectively reducing the necessary manual operator force. Due to the fact that the lifting amplitude is predefined and limited the entire construction respectively realization of the lifting mechanism may be simple, cost efficient and/or space-saving in particular without the need of a motor and/or electronic components.

In an example embodiment of the lifting mechanism further comprises a force accumulator, such as a mechanic, electric, pneumatic, hydraulic and/or magnetic force accumulator, in particular a spring, and a particularly mechanic transmission being configured to transmit the accumulated force of the force accumulator into a lifting force on the foldable ramp. In a further development the lifting mechanism a predefined limited swiveling amplitude is reached when the weight of the foldable ramp and the accumulated force of the force accumulator compensate each other. In other words, the lifting mechanism uplifts the ramp in a swiveling motion as long as the force accumulator exerts a higher force than the gravitational force of the foldable ramp during the lifting motion. This easy and simple concept of lifting the foldable ramp in to a position where, firstly, the highest necessary forces are already overcome, and, secondly, where the operator can easily reach and grasp the already lifted ramp in order to lift respectively swivel the ramp over the remaining swivel amplitude.

According to another aspect of the present disclosure, which may be combined with the previous aspects and exemplary embodiments, a lifting mechanism for a foldable ramp that provides wheelchair access to a passenger car rear door is provided.

The foldable ramp may comprise a one-part or a multi-part entry platform which can be arranged in several positions. The foldable ramp can be swiveled between several positions including a passive position in which the foldable ramp is arranged in the car in a lying position. The foldable ramp, respectively the entry platform, may further be designed such that it may be arranged in an entry position in which the foldable ramp is folded out of the car to allow wheelchair access to the car. In the entry position, the foldable ramp may be oriented at an angle between 5° and 30°, preferably between 10° and 20°, relative to the horizontal. Due to such an orientation of the foldable ramp during access of the wheelchair, the wheelchair may easily and smoothly access the interior of the passenger car. For example, the length of the ramp in a length-wise direction of the car is larger than 20 cm and preferably less than 2.5 m, preferably between 50 cm and 2 m. The foldable ramp may be further configured such that it may be arranged in a transport position, i.e. a position in which a wheelchair has accessed the interior of the passenger car via its rear door and in which the passenger car may be driven while the wheelchair and the entry platform are stored in the back of the passenger car. In the transport position, the entry platform may be oriented in an upright position, particularly in a vertical position.

According to this aspect, the lifting mechanism is configured to exert a lifting force on the foldable ramp at a force application point that is arranged in a distance of at least ⅓, particularly ½ or ⅔, of a length of the foldable ramp with regard to the swivel axis of the foldable ramp. In comparison to complex prior art lifting mechanisms that directly acted on the rotational shaft of the swiveling ramp, thereby requiring a high actuation force which had to be generated by a motor, the lifting mechanism according to the present disclosure uses the principal of a leverage arm or moment of force arm such that the foldable ramp may still reliably be lifted, however, the required input forces are much lower and/or without the need of a motor. The force application point may be referred to as a connection point between the lifting mechanism and the foldable ramp and/or a point or position where the lifting force is introduced to or applied onto the ramp.

In another example embodiment of the lifting mechanism, the lifting mechanism further comprises as particularly mechanic transmission with a swivel lifting arm performing a swivel motion to exert a lifting force on the foldable ramp causing the foldable ramp the swivel upwards. A swivel radius of the swivel lifting arm is smaller, particularly less than a half, a third or a quarter, than a swivel radius of the foldable ramp.

According to another aspect of the present disclosure which may be combined with the previous aspects and exemplary embodiments, a foldable ramp for wheelchair access to passenger car rear door is provided.

The foldable ramp comprise a one-part or multi-part entry platform that can be arranged in several positions including an entry position in which the ramp is folded out of the car to allow wheelchair access to the car, a transport position in which the entry platform is arranged in the car in an upright position and the passive position in which the entry platform is arranged in the car in the lying position. The foldable ramp may be swiveled between several positions including a passive position in which the foldable ramp is arranged in the car in a lying position. The foldable ramp, respectively the entry platform, may further be designed such that it may be arranged in an entry position in which the foldable ramp is folded out of the car to allow wheelchair access to the car. In the entry position, the foldable ramp may be oriented at an angle between 5° and 30°, preferably between 10° and 20°, relative to the horizontal. Due to such an orientation of the foldable ramp during access of the wheelchair, the wheelchair may easily and smoothly access the interior of the passenger car. For example, the length of the ramp in a length-wise direction of the car is larger than 20 cm and preferably less than 2.5 m, preferably between 50 cm and 2 m. The foldable ramp may be further configured such that it may be arranged in a transport position, i.e. a position in which a wheelchair has accessed the interior of the passenger car via its rear door and in which the passenger car may be driven while the wheelchair and the entry platform are stored in the back of the passenger car. In the transport position, the entry platform may be oriented in an upright position, particularly in a vertical position.

The foldable ramp further comprises a lifting mechanism according to one of the previous aspects and/or embodiments configured to act on the entry platform. The embodiments and advantages described with regard to the inventive lifting mechanism may also be referred to the foldable ramp according to the present disclosure.

According to a further development of the foldable ramp, the foldable ramp comprises a carrier. In an exemplary embodiment, the carrier is in the form of a protruding pin or a recess, fixedly connected to the entry platform and coupled to the lifting mechanism.

It is noted that the method according to the disclosure can be defined such that it realizes the controller and/or the display device according to the described aspects of the disclosure, and vice versa.

In the following detailed description of exemplary embodiments of the present disclosure a lifting mechanism is generally indicated with the reference numeral 1.

Figure 1:
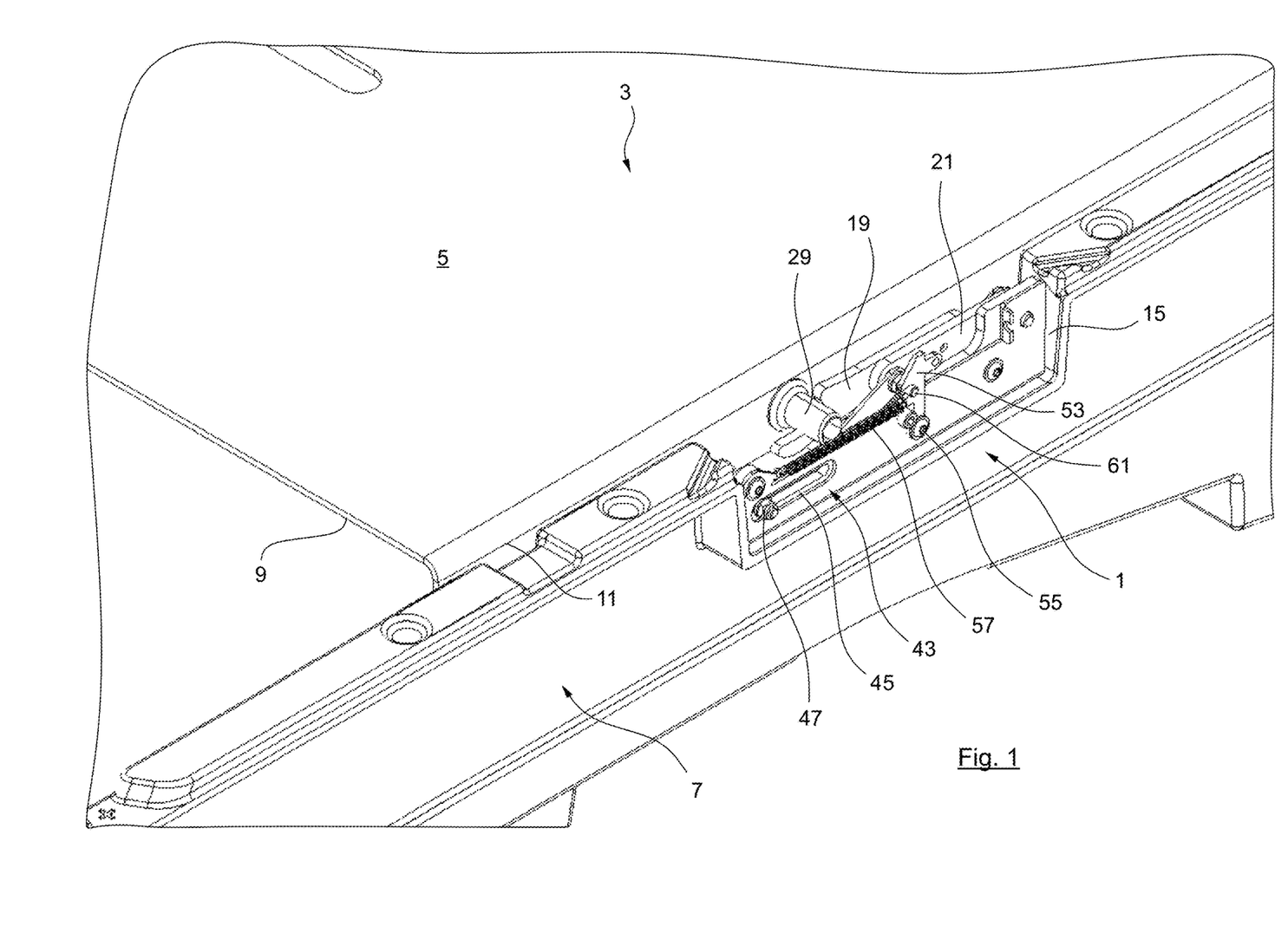
FIG. 1 shows a schematic view of a foldable ramp with a lifting mechanism according to an exemplary embodiment of the disclosure in a first operational position.

FIG. 1 shows a perspective part view of a foldable ramp (3) for providing wheelchair access to a passenger car rear door, wherein only a side body (7) of the vehicle chassis is shown in FIG. 1, and a lifting mechanism (1) according to the disclosure mounted to the chassis (7) and configured to lift respectively swivel the foldable ramp (3) from its passive lying position, as shown in FIG. 1. The foldable ramp (3) comprises a one-part or multi-part entry platform (5) which defines an essentially even, flat two-dimensional storing and driving surface. The foldable ramp may be controlled manually and may have no electric or other drive units for moving the foldable ramp (3) respectively the entry platform (5) at least between an entry position (not shown) in which the foldable ramp is folded out of the car to allow wheelchair access to the car, a transport position in which the wheelchair has accessed the interior of the passenger car via its rear door and in which the passenger car may be driven while the wheelchair and the entry platform are stored in the back of the passenger car, and a passive position in which the entry platform is provided in the passenger car in a lying position (FIG. 1). The entry platform (5) comprises a front end (9) which oriented in the forward driving direction of the vehicle when the entry platform (5) is arranged in the passive lying position as shown in FIG. 1. The entry platform (5) further comprises side walls (11) on each lateral side of the entry platform (5). The entry platform (5) may be configured and designed such that the side walls (11) slightly contact or are arranged in a small distance with regard to the side body (7) of the vehicle chassis.

Figure 2:
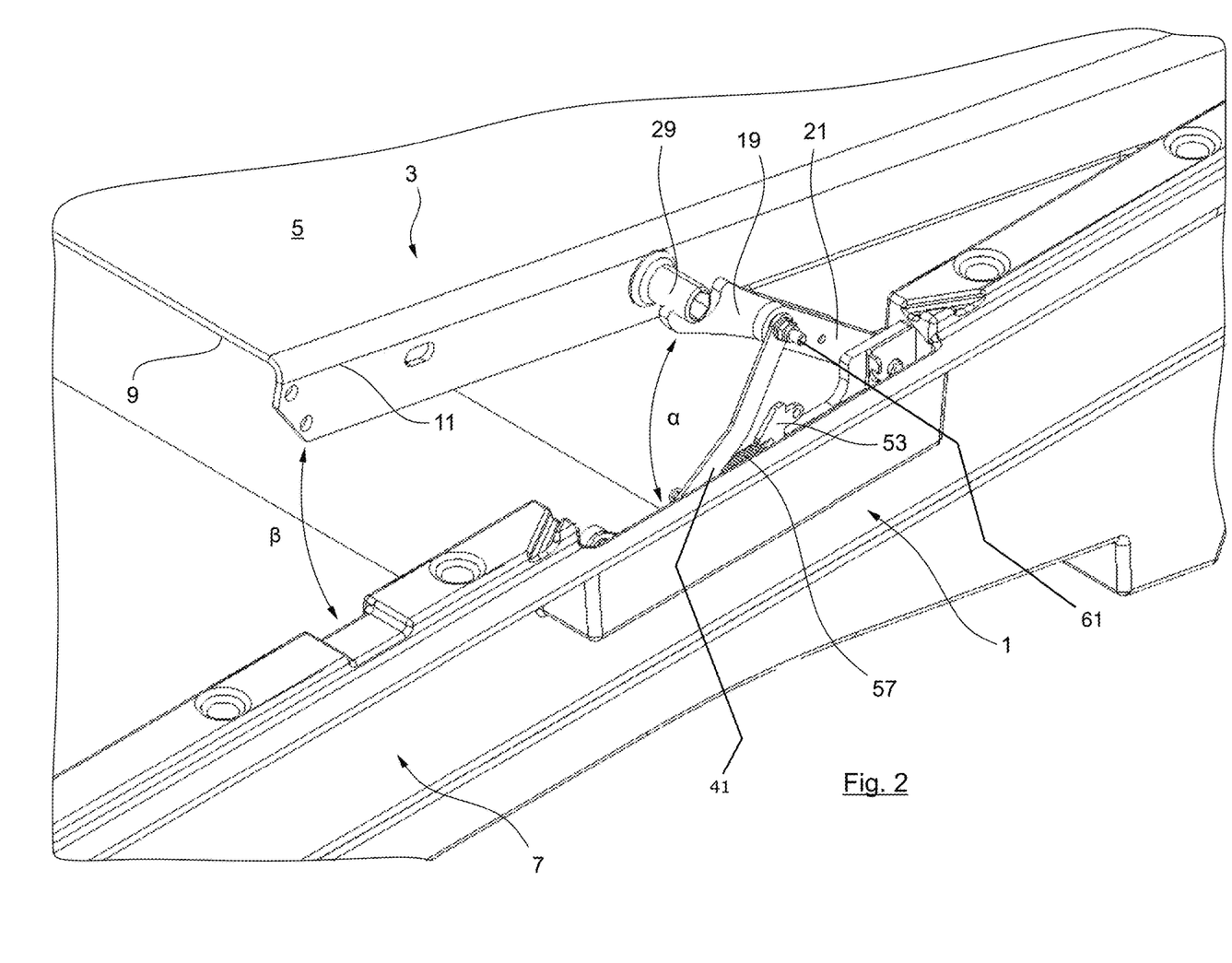
FIG. 2 shows the foldable ramp of FIG. 1 in a second operational position.

The functioning and the design of the lifting mechanism (1) according to the example embodiments of the present disclosure are described under reference to the FIGS. 3 to 10. Under comparison of FIGS. 1 and 2, two operational states of the lifting mechanism (1) are shown: In FIG. 1, the lifting mechanism is positioned in its biased operational state corresponding to the passive position of the foldable ramp. On the other hand, FIG. 2 shows the released operational state of the lifting mechanism corresponding to a lifting position of the foldable ramp, indicated by the reference sign α corresponding to a swivel amplitude β of the foldable ramp (3). A general idea of the lifting mechanism (1) according to the disclosure is to facilitate, in particular to automatize, the initial uplift of the foldable ramp (3) from the lying passive position (FIG. 1) into a lifted position (FIG. 2) where the entry platform is arranged in an angle β with regard to the horizontal such that the user of operator may easily grasp the forward end (9) of the entry platform (5) to move the entry platform (5) along the rest of the swivel amplitude of the foldable ramp (3). This means that the lifting mechanism (1) according to the present disclosure only performs a limited uplift respectively swiveling motion of the foldable ramp, particularly for a swiveling amplitude β of at most 60°, 45° or 30°.

Referring now to FIGS. 3 to 10, where FIGS. 3, 4 and 7, 8 show the biased state of the lifting mechanism (1) and FIGS. 5, 6 and 9, 10 show the released operational state of the lifting mechanism (1), the lifting mechanism (1) comprises a frame (13) being L-shaped in cross-section and supporting all of the components of the lifting mechanism (1). Referring back in particular to FIG. 1, the side body (7) comprises a receiving recess (15) for receiving and mounting the entire lifting mechanism (1), in particular for mounting the frame (13) of the lifting mechanism (1).

The lifting mechanism (1) may be divided into two main components each being responsible for a different functionality: On the left side in FIG. 3 of the frame (13) there is provided the lifting mechanics, generally indicated by the reference numeral (15) and on the right side of the frame (13), there is provided the interlock, indicated by the reference numeral (17) (see also FIG. 4).

Starting with the lifting mechanics (15), as shown in FIGS. 3, 5, 7, and 9 the lifting mechanism (1) comprises a swivel lifting arm (19) being rotatably mounted to the frame (13) with regard to a rotational axis R(19). In the example embodiment according to FIG. 3, the swivel lifting arm (19) may be manufactured as a two-piece part comprising a further L-shaped arm (21) being fixedly attached to the swivel lifting arm (19) by means of a fastening means, such as pins (23). With the two-part design of the swivel lifting arm (19), it is possible to adjust the length of the swivel lifting arm (19) in particular to be adaptable with regard to different foldable ramp (3) designs of different vehicles. The pins (23) are received within a longitudinal slit (25) and may be released such that the swivel lifting arm (19) and the arm (21) may be moved relative to each other in order to adapt and define the resulting length of the swivel lifting arm (19) and therefore the amount of linkage to uplift the foldable ramp (3), as described later on. The swivel lifting arm (19), respectively the arm (21), is connected to the frame (13) by means of a screw (25). The swivel lifting arm (19) comprises a hook or a latch-shaped end (21) configured to engage a corresponding carrier (29) (FIG. 1) such as a pin, fixedly attached to the ramp (3). The engagement of the swivel lifting arm (19) with the lifting carrier (29) of the ramp defines a force application point where the lifting force generated by the lifting mechanism (1) is exerted respectively applied to the ramp (3) in order to lift and swivel the ramp (3) from the lying position shown in FIG. 1 to the lifted position shown in FIG. 2.

The lifting mechanism (1) further comprises a force accumulator (29), here in the form of an extension spring. The extension spring (29) is extended in the lying passive position of the foldable ramp (3) (FIG. 1, FIG. 3) respectively in the biasing state of the lifting mechanism thereby generating a bias which, upon activation, is used to uplift and swivel the foldable ramp (3). On an opposite end (31) of the swivel lifting arm (19, 21), the swivel lifting arm (19, 21) comprises a hook (33) for engaging with a mounting end (35) of the extension spring (29). Analogously, the opposite mounting end (37) of the extension spring engages another engaging portion (39) of the lifting mechanism (1). In the example embodiments, the engagement portion (39) is part of a linkage arm (41) which will be referred to particularly under reference to FIG. 5. In general, the force accumulator in the form of the extension spring (29) is designed such that upon activation of the lifting mechanism (1) respectively the swivel lifting arm (19), the extension spring (29) is released in order to generate a moment of force that causes the swivel lifting arm (19, 21) to swivel relative to its swivel axis R(19) and to transmit the moment of force via the swivel lifting arm (19) to the lifting carrier (29) of the foldable ramp (3) to lift the foldable ramp (3) without the need for an operator to manually apply lifting forces. As shown particularly in FIG. 3 and under reference to FIG. 5, when the lifting mechanism is activated in order to move from the biased operational state in FIG. 3 into the released operational state in FIG. 5, the accumulated force by the extension spring is released to pull via the engaging end (35) the hook shaped end (37) of the swivel lifting arm (19, 29), thereby introducing a moment of force with regard to the swivel axis R(19) in the reverse direction of the car.

Figure 5:
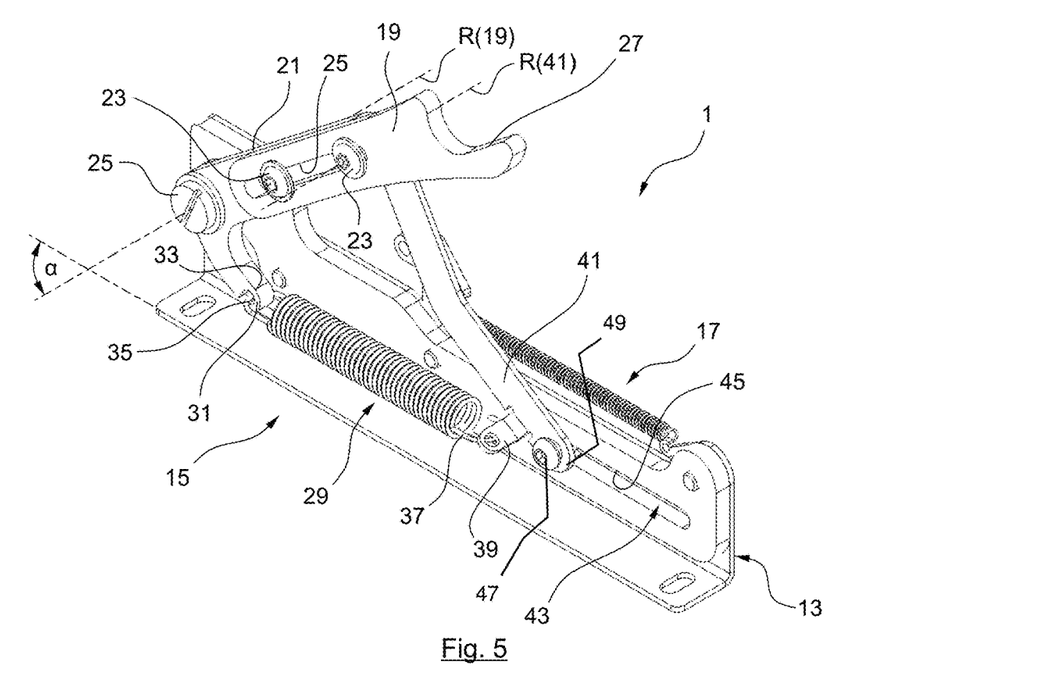
FIG. 5 shows a first perspective view of the lifting mechanism according to FIGS. 3 and 4, in another operational position.

Referring now to FIG. 5 in which the released operation state of the lifting mechanism (1) is shown corresponding to the lifted position of the foldable ramp (3) the mechanics of the lifting mechanism (1) becomes clear. By pulling the hook shaped end (33) of the swivel biasing arm (19, 21) in the forward direction of the car (in FIG. 5 to the right) the swivel lifting arm (19, 21) is swiveled with regard to its swivel axis R(19) upwardly such that the swivel lifting arm (19, 21) is orientated at an angle α with regard to the horizontal.

The lifting mechanism (1) according to the figures also comprises a linkage arm (41) that is rotatably mounted to the swivel lifting arm (19) by means of the pins (23) that defines a rotational axis R(41) and which is further translationally guided in a linear motion bearing (43) in the form of a shifting link or Stephenson link. The linear motion bearing (43) comprises a longitudinal slit in which a guiding pin connected to the linkage arm (41) is translationally guided. The guiding slit (45) is orientated essentially horizontal.

Figure 3:
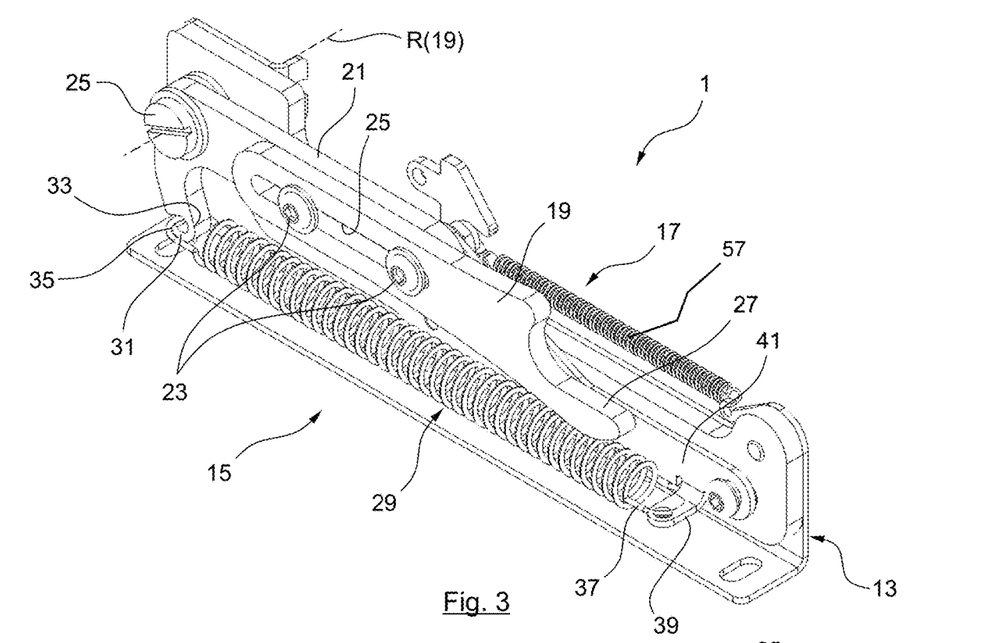
FIG. 3 shows a first perspective view of a lifting mechanism according to an exemplary embodiment of the disclosure.

As may be further seen in FIGS. 3 and 5 the engagement portion (39) is part of the linkage arm (41) such that up on activation of the lifting mechanism (1) respectively the swivel lifting arm (19, 21) releasing of the extension spring (29) generates a pulling a force on the engagement portion (39) of the linkage arm (41) which causes the linkage arm (41) to perform a combined translational rotational movement. Namely, the guiding pin (47) connected to a guiding end (49) of the linkage arm (41) is translationally moved within the guiding slit (45) in forward direction of the car and at the same time a bearing end (51) of the linkage arm (41) opposite the guiding end (49) is moved upwards in a rotational motion. In this way, the linkage arm (41) may support the swivel lifting arm (19, 21) when uplifting the foldable ramp (3). In the biasing operational state of the lifting mechanism (1), the swivel lifting arm (19, 21), the linkage arm (41) and the extension spring (29) are orientated essentially parallel with regard to each other, wherein in the released operational state of the lifting mechanism (1), the swivel lifting arm (19, 21), the linkage arm (41) and the extension spring (29) essentially form a triangle, the angle α between the direction of extension of the extension spring (29) and the direction of extension of the swivel lifting arm (19, 21) defining the swivel amplitude of the swivel lifting arm (19, 21) corresponding to a certain, predefined limited lifting amplitude β of the foldable ramp (compare FIG. 2).

Figure 4:
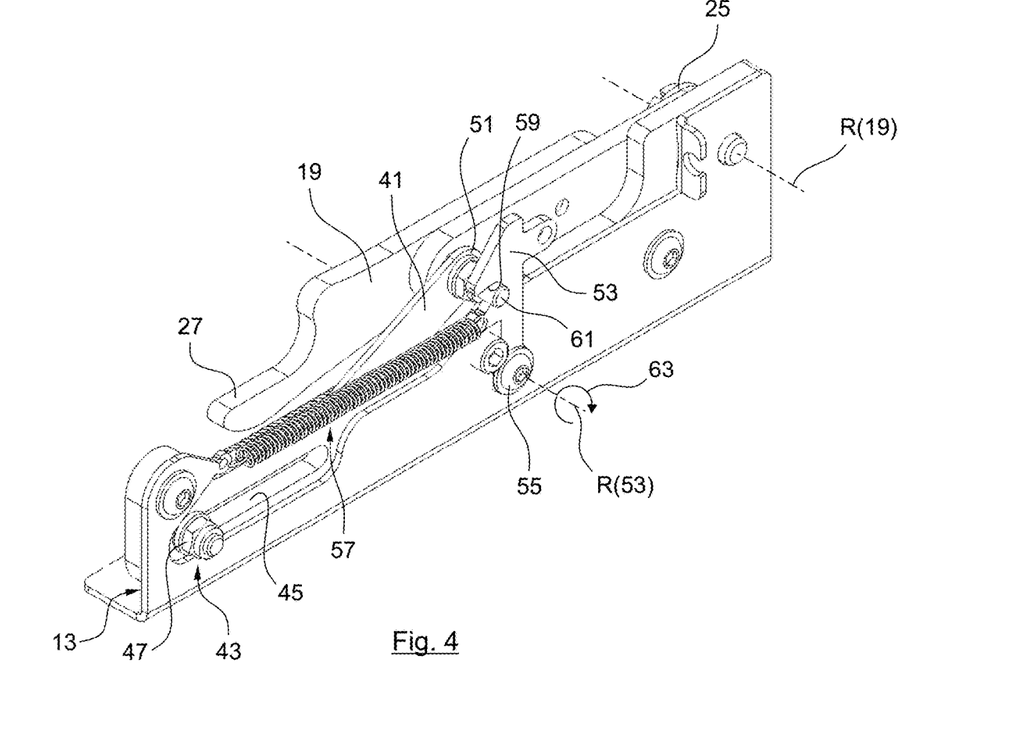
FIG. 4 shows a second perspective view of the lifting mechanism according to FIG. 3.
Figure 6:
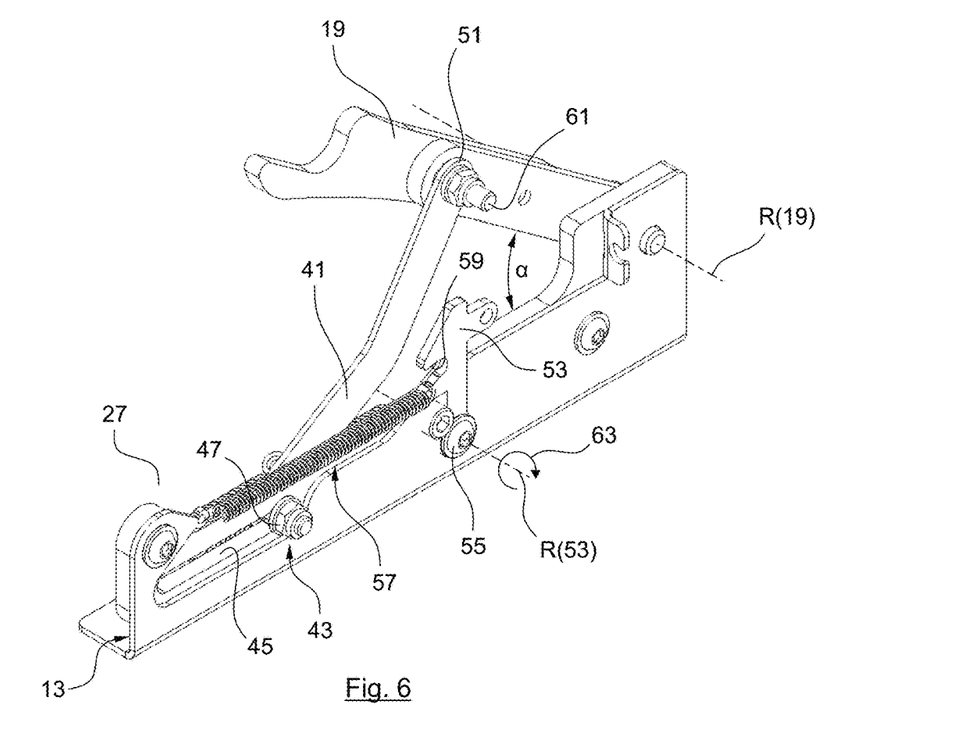
FIG. 6 shows a second perspective view of the lifting mechanism according to FIG. 5.

Now particularly referring to FIGS. 4 and 6 showing the interlock mechanism (17) of the lifting mechanism (1) it may be seen that the interlock mechanism (17) may also be fully mechanic without the need of any electric or motor components. However, it is also possible to combine the interlock (17) with a control unit for activating respectively deactivating the interlock (17). The interlock (17) comprises a securing latch (53) rotatably mounted to the frame (13) by means of a securing pin (55) defining a rotational axis R (53). The securing latch (53) is biased, in particular spring-biased by an extension spring (57) attached on one end to the frame (13) and on the opposite end to the securing latch (53). The extension spring (57) tends to bias the securing latch (53) into the biased operational state of the lifting mechanism (1). In the biased operational state of the lifting mechanism (1) the securing latch (53) engages the lifting mechanics (15) such that the swivel lifting arm (19, 21) is prohibited from uplifting respectively swiveling upwards to uplift the foldable ramp (3). This means that in the active state of the securing latch (53) the securing latch (53) prevents releasing of the accumulated force of the force accumulator (29).

As shown in FIG. 4, the engagement between the securing latch and the lifting mechanics (15) is realized by means of a securing recess (59) in the securing latch (53) which is configured to cooperate with a securing carrier (61) corresponding to and/or manufactured in one piece with the pin (23) that rotationally mounts the swivel lifting arm (19) to the linkage arm (41). As long as the securing pin (61) is received within the securing recess (59) of the securing latch (53) the lifting mechanism (1) is held in its biasing operational state. As soon as the interlock (17) is activated respectively released, which is done by a translational and/or rotational movement of the securing latch (53), indicated with the reference number (63) in FIG. 4, the force accumulator (29) immediately releases its biasing force causing the lifting mechanism (1) to move into its released operational state, as shown in FIG. 6.

Again referring to FIGS. 1 and 2, further aspects and advantages of the present disclosure become apparent. The lifting mechanism (1) according to the present disclosure is configured to exert a lifting force on the foldable ramp (3) in the passive position of the foldable ramp (3) for a predefined, limited swiveling amplitude β of at most 60°, 45° or 30°. This means that the position of the foldable ramp (3) shown in FIG. 2 corresponds to the maximum lifting amplitude which may be performed and initiated by the lifting mechanism (1). The lifting mechanism (1) therefore serves to perform the initial upwards movement of the foldable ramp into a certain position from which the user can easily grasp the ramp (3) and perform a further rotational respectively motion of the ramp (3) for example out of the car. Another aspect is that, as particularly shown in FIG. 2, the lifting mechanism (1) exerts its lifting force on the foldable ramp (3) via the swivel lifting arm (19, 21) and the lifting carrier (29) of the foldable ramp (3) wherein the engagement between the swivel lifting arm (19, 21) and the lifting carrier (29) defines a force application point that is arranged at a distance of at least ⅓, particularly of at least H or ⅔, of a length of the foldable ramp with regard to the swivel axis R(19) of the foldable ramp (3). Due to this design and arrangement of the inventive lifting mechanism (1) a simple construction with no complex components already is sufficient to uplift a foldable ramp and in particular to overcome the "bottleneck" in terms of improving the ergonomic handling of the ramp and in terms of reducing the high operational forces necessary for lifting a ramp.

Figure 7:
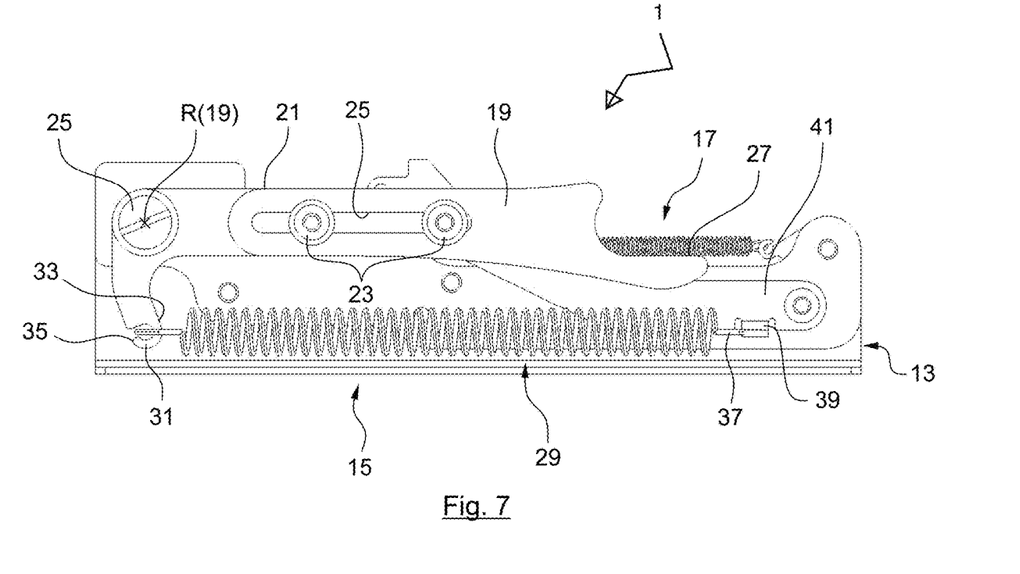
FIG. 7 shows a side view of the lifting mechanism according to FIG. 3.
Figure 8:
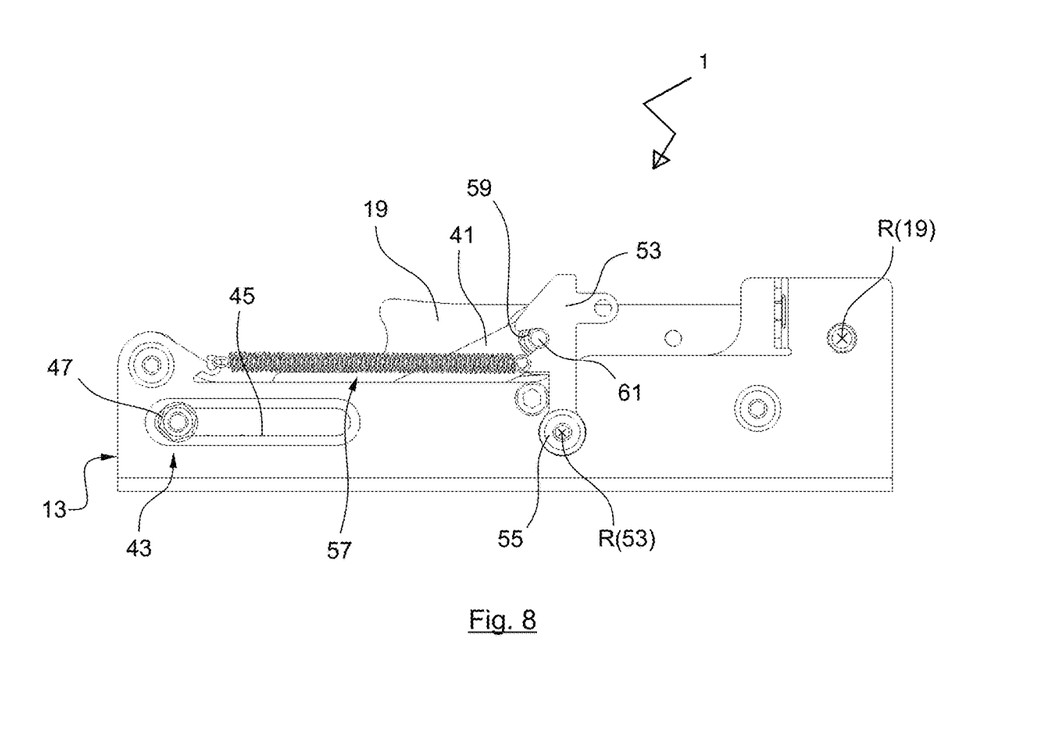
FIG. 8 shows a side view of the lifting mechanism according to FIG. 4.
Figure 9:
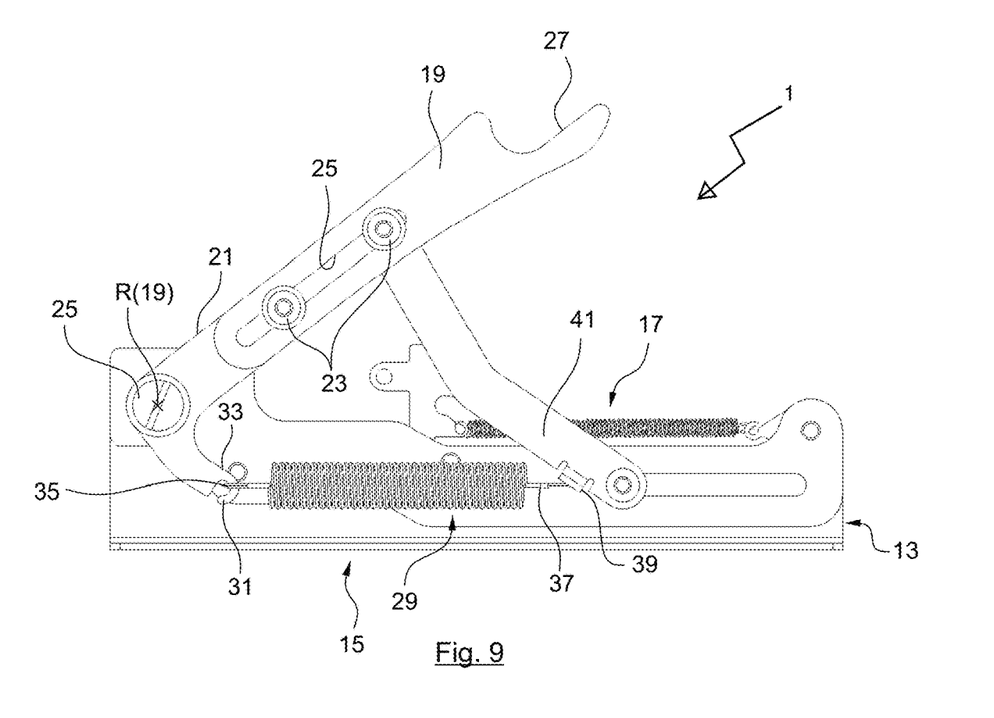
FIG. 9 shows a side view of the lifting mechanism according to FIG. 5.
Figure 10:
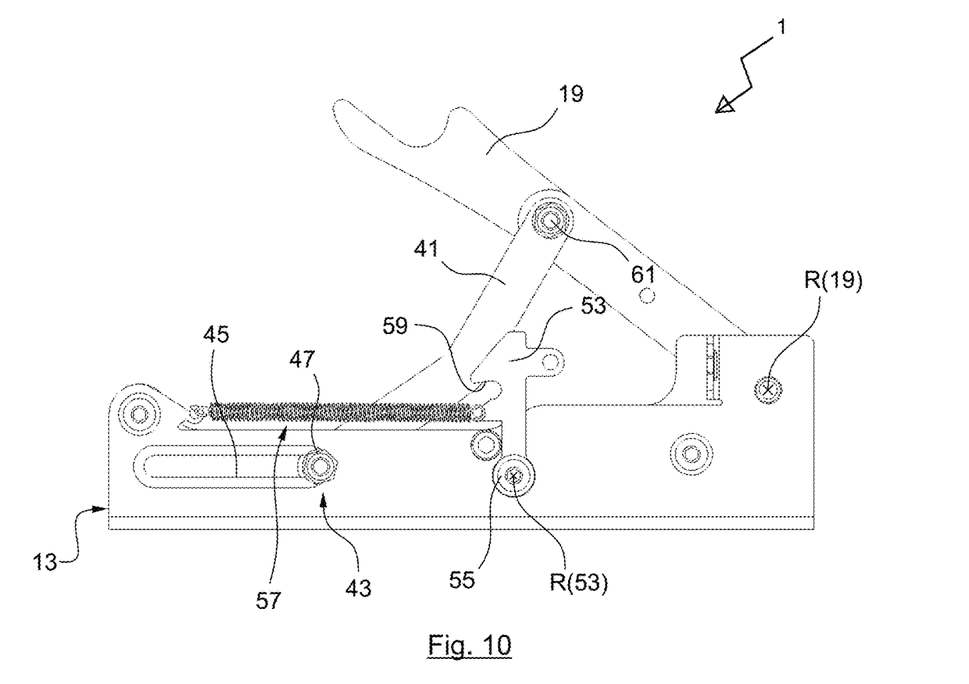
FIG. 10 shows a side view of the lifting mechanism according to FIG. 6.

FIGS. 7 to 10 essentially correspond to FIGS. 3 to 6 and show the lifting mechanism (1) in side views in addition to the perspective views of FIGS. 3 to 6. In particular, a comparison between FIGS. 7 and 9 illustrates the accumulation and release of force by the spring (29), i.e. the double extension and double contraction.

The features disclosed in the above description, the figures and the claims may be significant for the realization of the disclosure in its different embodiments individually as in any combination.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 lifting mechanism
3 foldable ramp
5 entry platform
7 side body
11 side wall
9 forward end
13 frame
15 lifting mechanics
17 interlock
19 swivel lifting arm
21 arm
23,25 pin
27 engaging end
29 force accumulator
31 end
33 hook
35,37 engaging end
39 engaging portion
41 linkage arm
43 linear motion bearing
45 guiding slit
47 guiding pin
49 guiding end
51 bearing end
53 securing latch
55 pin
57 extension spring
59 securing recess
61 securing pin
63 activation direction
R(i) rotational axis of component i

The invention claimed is:

1. A lifting mechanism for a foldable ramp providing wheelchair access to a passenger car rear door, the foldable ramp being swivelable between several positions including a passive position in which the foldable ramp is arranged in the car in a lying position, the lifting mechanism comprising:
 a force accumulator configured to generate a bias force and including an extension spring; and
 a swivel lifting arm configured to: be biased, by the bias force generated by the force accumulator, in the passive position of the foldable ramp and be activated to release and transmit its bias into a lifting force on the foldable ramp, wherein the swivel lifting arm includes a force application section configured to transmit the lifting force on the foldable ramp and a lever section opposite the force application section and connected to the extension spring.

2. The lifting mechanism according to claim 1, wherein the force accumulator is a mechanic, electric, pneumatic, hydraulic and/or magnetic force accumulator.

3. The lifting mechanism according to claim 1, wherein a swivel axis of the swivel lifting arm crosses the swivel lifting arm and is arranged between the force application section and the lever section.

4. The lifting mechanism according to claim 1, wherein the swivel lifting arm is rotatably mounted with respect to the foldable ramp such that upon activation of the swivel lifting arm, the bias generates a moment of force that causes the swivel lifting arm to swivel relative to its swivel axis and to apply the lifting force on the foldable ramp.

5. The lifting mechanism according to claim 1, further comprising a linkage arm rotatably mounted to the swivel lifting arm and being biased, by the force accumulator, in the passive position of the foldable ramp, wherein, upon activation of the swivel lifting arm, the bias of the linkage arm is transmitted into a support force supporting the swivel lifting arm lifting force.

6. The lifting mechanism according to claim 5, wherein the swivel lifting arm and the linkage arm form a knee lever mechanism.

7. The lifting mechanism according to claim 5, wherein the linkage arm is connected to the force accumulator such that, upon activation of the swivel lifting arm, the force accumulator releases, thereby causing the swivel lifting arm and the linkage arm to oppositely swivel.

8. The lifting mechanism according to claim 5, wherein the linkage arm and the swivel lifting arm are arranged parallel with respect to each other in the passive position of the foldable ramp and are oriented at an angle in the range of 45° to 135° in a lifted position of the foldable ramp.

9. The lifting mechanism according to claim 5, wherein the linkage arm is configured to be guided in a linear-motion bearing, the force accumulator cooperating with the linear-motion bearing such that the force accumulator is configured to pull the linkage arm along the linear-motion bearing in response to being released.

10. A lifting mechanism for a foldable ramp providing wheelchair access to a passenger car rear door, the foldable ramp being swivelable between several positions including a passive position in which the foldable ramp is arranged in the car in a lying position, the lifting mechanism comprising: an arm configured to exert a lifting force on the foldable ramp in the passive position for a predefined limited swiveling amplitude of the foldable ramp of at most 60°.

11. The lifting mechanism according to claim 10, further comprising: a force accumulator configured to accumulate a force, and a mechanic transmission configured to transmit the accumulated force of the force accumulator into a lifting force on the foldable ramp, wherein the predefined limited swiveling amplitude is reached when the weight of the foldable ramp and the accumulated force of the force accumulator compensate each other.

12. A foldable ramp for wheelchair access to a passenger car rear door, comprising:
 an entry platform configured to be arranged in several positions including an entry position in which the ramp is folded out of the car to allow wheelchair access to the car, a transport position in which the entry platform is arranged in the car in an upright position, and a passive position in which the entry platform is arranged in the car in a lying position; and
 a lifting mechanism according to claim 1 and configured to act on the entry platform.

13. The foldable ramp according to claim 12, comprising a carrier fixedly connected to the entry platform and coupled to the lifting mechanism.

14. The lifting mechanism according to claim 1, further comprising a frame, the swivel lifting arm being mounted on the frame and configured to be displaced with respect to the frame to provide the lifting force on the foldable ramp.

15. The lifting mechanism according to claim 1, wherein the swivel lifting arm is L-shaped, the force application section being a first extension of the L-shaped swivel lifting arm and the lever section being a second extension of the of the L-shaped swivel lifting arm, and the first extension and the second extension being arranged to form an L-shape.

16. The lifting mechanism according to claim 3, wherein the force application section and the lever section each extend from the swivel axis in an angled relationship with respect to each other.

17. The lifting mechanism according to claim 1, wherein the extension spring is directly connected to the lever section.

18. The lifting mechanism according to claim 1, wherein the force application section and the lever section are angularly arranged with respect to each other.

* * * * *